(No Model.)  3 Sheets—Sheet 1.
C. W. ROTH.
COMBINED ELECTRICAL WEIGHING SCALE AND FLOUR AND BRAN PACKER.
No. 321,387.  Patented June 30, 1885.
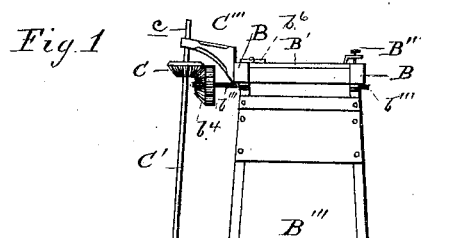
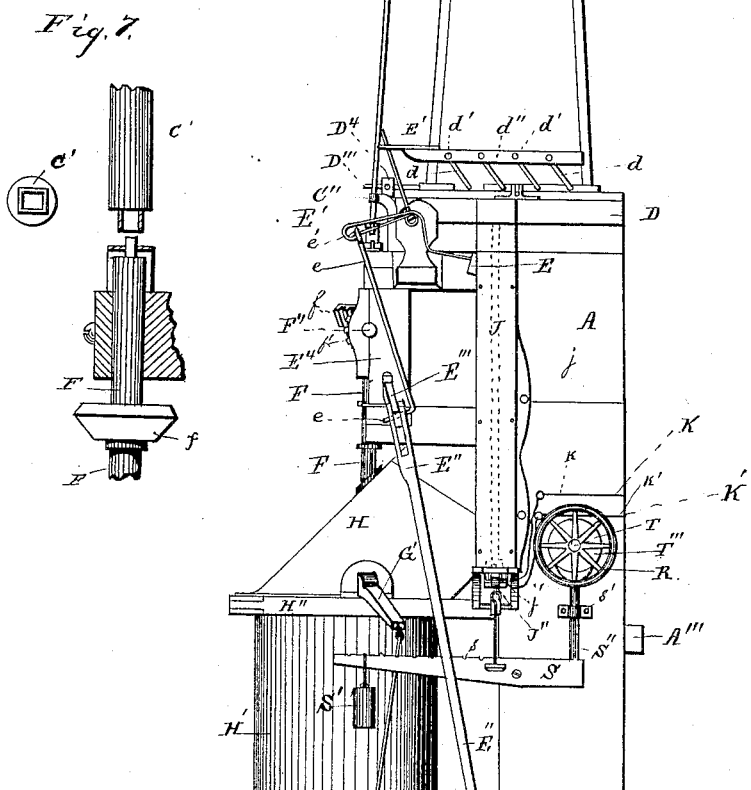
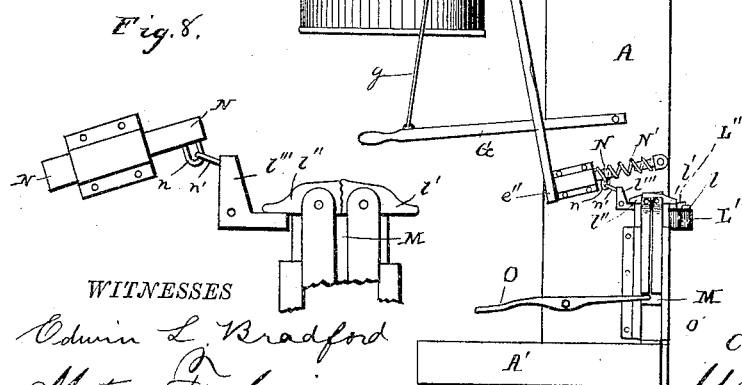
WITNESSES
Edwin L. Bradford
Morton Toulmin
INVENTOR
Charles W. Roth
W. P. Leonard
Attorney (No Model.) 3 Sheets—Sheet 2.
C. W. ROTH.
COMBINED ELECTRICAL WEIGHING SCALE AND FLOUR AND BRAN PACKER.
No. 321,387. Patented June 30, 1885.
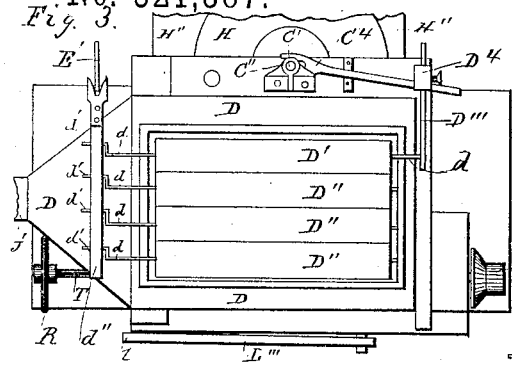
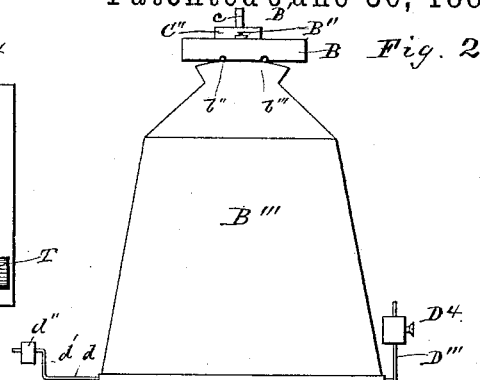
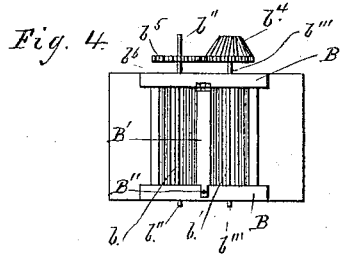
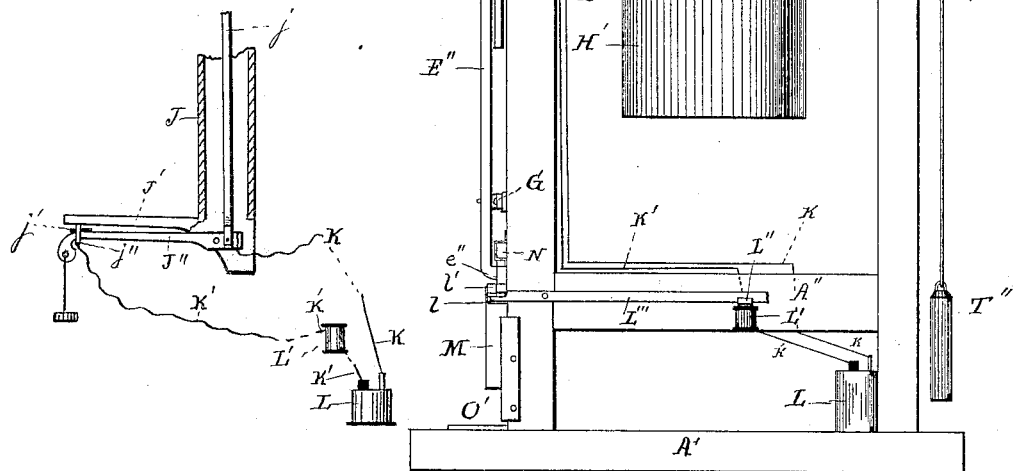
WITNESSES
Edwin L. Bradford
Morton Toulmin
INVENTOR
Charles W. Roth
W. P. Leonard
Attorney

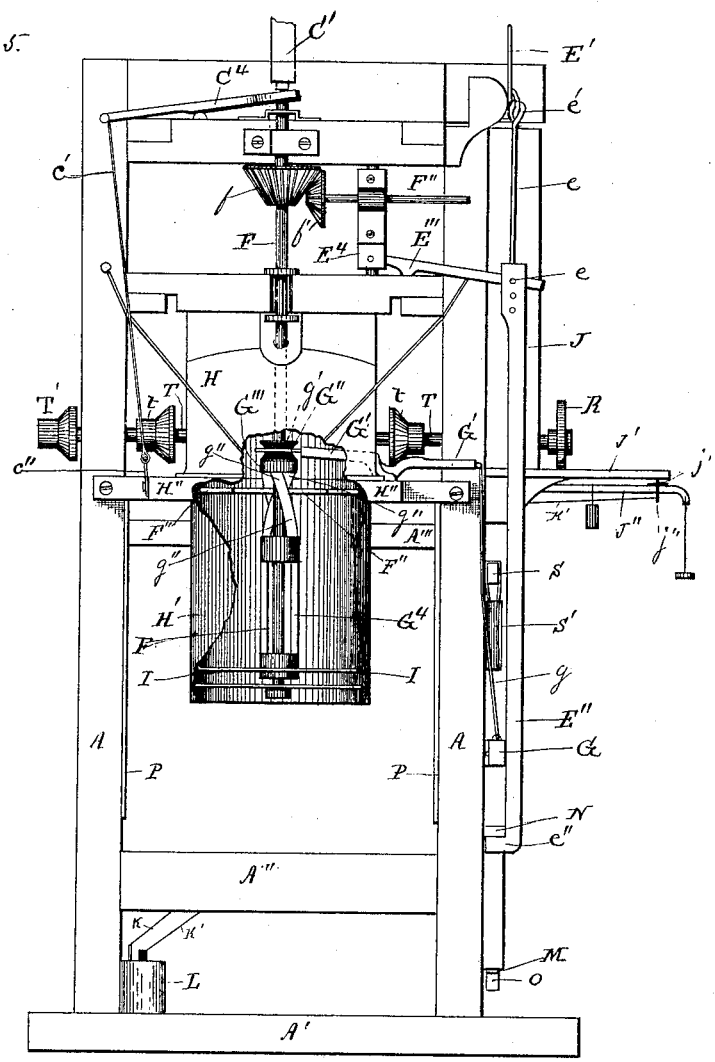

UNITED STATES PATENT OFFICE.

CHARLES W. ROTH, OF EVANSVILLE, INDIANA.

COMBINED ELECTRICAL WEIGHING-SCALE AND FLOUR AND BRAN PACKER.

SPECIFICATION forming part of Letters Patent No. 321,387, dated June 30, 1885.

Application filed October 22, 1884. (No model.)

*To all whom it may concern:*

Be it known that I, CHARLES W. ROTH, a citizen of the United States, residing at Evansville, in the county of Vanderburg and State of Indiana, have invented certain new and useful Improvements in Combined Electrical Weighing-Scales and Flour and Bran Packers, of which the following is a specification, reference being had therein to the accompanying drawings.

This invention relates to improvements in combined electrical scales and flour and bran packers, and has for its objects to weigh, automatically, given quantities of flour, bran, or grain, and pack the same in sacks, barrels, or other receptacles, in order that any number of packages may be filled with uniform quantities automatically.

The objects are attained by the mechanism illustrated in the accompanying drawings, forming a part of this specification, in which—

Figure 1 is an elevation taken from one side of the machine. Fig. 2 is an elevation taken from another side of the machine. Fig. 3 is a plan with some of the parts removed and some parts broken away. Fig. 4 is a detached view of the feed-rollers. Fig. 5 is an elevation with some of the parts removed and broken away. Fig. 6 is a detached view showing the scale-beam, a portion of the rod connecting it with the platform, and the electrical connections. Fig. 7 is a detailed enlarged view showing the means for uniting the drive-shaft and the shaft for operating the feed-rollers, and Fig. 8 an enlarged side elevation of the devices for holding and releasing the rod E'', whose functions hereinafter appear.

A indicates vertical posts forming a part of the frame of the machine; A', the base or floor; A'' A''', transverse frames which connect the frames A to one another. B is a frame, which forms the bearings of two fluted feed-rollers, $b$ $b'$, which are provided, respectively, with shafts $b''$ $b'''$, having a spur and bevel gearing, $b^4$, and spur-wheel $b^5$, by means of which rotary motion is imparted to the fluted feed-rollers $b$ $b'$ by the bevel-wheel C, which meshes into the bevel-gearing $b^4$, and is attached to the vertical shaft C', which is provided with a long journal, $c$, at its upper extremity, having a bearing in the bracket C''', attached to the frame B. The long journal $c$ permits the shaft C' to be raised, and thereby throw the bevel-wheel C out of gear with the bevel-gearing $b^4$.

The upper part of the frame B has a hinge, $b^6$, by which the cross-piece B' is connected thereto. On one end of said piece B' is a set-screw, B'', by means of which the cross-piece B' may be raised or lowered, and thus regulate the quantity of flour, bran, or other material which is allowed to pass between the two feed-rollers $b$ $b'$. The frame B rests upon the top of the feed-box B''', and is secured thereto in any suitable manner.

The feed-box B''' rests on top of the platform of an iron scale box or frame, D, supported in the same manner as the platform of an ordinary scale, and made of a single casting. This platform is composed of pivoted slats D' D'', and forms the bottom of the feed-box. These slats when in a horizontal position retain the contents within the feed-box, but when turned on their axes permit the contents to drop through into the packing devices below. Each slat has a shaft or pivot, $d$, provided with a crank, $d'$, each of which cranks engages with a beam or connecting-link, $d''$, whereby all of the slats may be turned upon their axes simultaneously, in the manner hereinafter described.

The slat D' has its shaft $d$ made a little longer than the other shafts of the series, and thereby extends beyond the end of the scale-box D, as shown on the right-hand side in Fig. 3, and has an arm, D''', attached thereto at a right angle, as shown on the right-hand side in Fig. 3. This arm D''' has an adjustable weight, $D^4$, which holds the slat D', together with the slats D'', in a horizontal or closed position until opened by the action of the weight E, which is hung to one of the arms of a bell-crank lever, E', the upper end of which bears against a fork in the outer end of the beam $d''$ whenever the vertical shaft E'' is released from the holding mechanism at its lower end. This freeing of the shaft E'' allows the weight $D^4$ to turn the arm D''' on its pivotal point, and thus throw the upper end of said arm against the beam $d''$ and operate the cranks $d'$, as seen in Fig. 3, and open or separate the slats.

The scale-box D is provided with a series of doors, 1, on its opposite sides, which, when opened, permit the machinery of the scale to be seen and any accumulations therein to be removed therefrom.

The vertical shaft C' has a bearing, C'', near the bottom, in which it slides freely up and down, and at the lower end a square socket, which fits over a projecting key at the upper end of the shaft F, by means of which rotary motion is imparted to the shaft C' when the machine is in operation, and the key and socket are permitted to engage with each other, as clearly seen in Fig. 7. A forked lever, $C^4$, straddles the bottom of the shaft C', and is for the purpose of raising and lowering the shaft C', and thereby throwing the bevel-wheel C in and out of gear with the bevel-gearing $d^4$. The outer end of the forked lever $C^4$ is provided with a rod or cord, c', having at its lower end a hook, c'', which is intended to engage with a nail or button located at any convenient point below, whereby the lever $C^4$ may be held down when it is desired to raise the shaft C', which is done by pulling the cord c' in a downward direction.

The vertical shaft or rod E'' is connected to the bell crank lever E' by means of a rod or link, e, the upper end of which is formed into a loop or hook, e', by means of which it is attached to the bell crank lever E'. The lower end of the rod e is of L shape, and is adapted to enter any one of a series of openings in the top of the shaft E'', which has a slot to receive the outer end of a lever, E''', having an opening for the passage of the L-shaped portion of the rod e, whereby the lever E''' and the shaft E'' are pivoted to each other by the rod e, when passed through the opening in the end of the lever E''', and any two of the openings in the slotted part of the shaft E'', heretofore described. The inner end of the lever E''' enters a slot in one side of a vertically-sliding box, $E^4$, which forms the bearing of a shaft, F'. When the outer end of the lever E''' is depressed, the box $E^4$ is raised; and, on the other hand, when the lever E''' is raised the box $E^4$ will be lowered, for purposes hereinafter described.

The lower end of the shaft E'' has a hook, e''', which is intended to engage with a sliding bolt, N, by means of which the shaft E'' may be held down when the said shaft E'' is depressed, so as to engage with said bolt. This shaft E'' is depressed by means of the lever G, having one end pivoted to the frame A, and being also pivoted to the shaft E''. The outer end of this lever G is formed into a handle in order that it may be easily grasped and held by the operator or workman. A cord, g, extends from the lever G in an upward direction, and is attached to a lever, G', whereby these two levers G and G' may be depressed simultaneously.

The lever G' extends through an opening in one side of the tube or cylinder H, and has on its inner end a fork, G'', which fits into a groove, g', in a collar, G'''. Surrounding the shaft F, and from the bottom of this collar G''', extend downwardly three spiral pieces of sheet metal, g'', the lower ends of which are attached to the hollow shaft (or its equivalent) $G^4$, having attached to its lower extremity the transverse arms I. The spiral pieces g'' pass between three wings, F'', attached spirally to the shaft F, (after the manner of a screw-propeller.) As these pieces g'' bear against the wings F'', when the lever G' is moved up or down the arms I have two motions—viz., an up-and-down motion and a partly rotary motion, by means of which the bran or flour within the cylinder H' may be more or less shaken, and thereby be caused to flow more evenly in a downward direction when propelled by the spiral wings F''' and the auger-shaped disks F''', which latter are secured to the lower extremity of the shaft F, which, when revolving, causes these disks and wings F''' to act in the manner of a screw to press the contents of the cylinder H' into any receptacle placed below the mouth of the cylinder to receive it—such as barrels or bags. A platform, H'', attached to frame A of the machine, supports the cylinders H H', as well as the fulcrum of the lever G'.

A box or casing, J, attached to frame A, extends from the bottom of the scale-box D in a downward direction, and has attached to it at the bottom an arm, J'. This box or case J incloses a vertical rod, j, attached to the bottom of the scale-box D. The rod j has its lower extremity pivoted to the scale-beam J'', which is pivoted to the arm J', and extends outwardly through a metal loop, j''.

When the flour or feed box B''' has received the desired quantity of flour or bran, the weight thereof causes the scale-platform to descend and bear upon the rod j, which will then bear upon the inner end of the scale beam and cause the outer end to rise. Therefore if the wires of an electro-magnet and galvanic battery are connected in the circuit, one wire, k, to the inner end of the metal scale-beam J'', and the other wire, k', to the metal loop j'', the circuit will be closed when the beam J'' is in contact with the loop j'', and the armature be attracted and held down upon the pole of the magnet as long as the current of electricity continues to flow.

L indicates a galvanic battery. k k' are wires leading therefrom. The wire k' extends from one element of the battery L, (either carbon or zinc,) and is then wound spirally around the cores of the electro-magnet L', then along the top of frame A'', then upwardly along the frame A, then through or around said frame A, as shown in dotted lines in Fig. 2, then to the loop j'', to which it is electrically connected. The wire k is connected to the other pole of the battery L, and then carried upwardly to the frame A'', then in a horizontal direction above said frame until it reaches the frame A, then upwardly along frame A, then through or around said frame A to the inner end of the metal scale-beam J″, to which it is (electrically) attached. Fig. 2 indicates the course of these wires.

L′ is an electro-magnet. L″ its armature, which is attached to the lever L‴, pivoted to the frame A″. The end l of the lever L‴ engages with a detent or pawl, l′, pivoted to the top of a sliding weight, M. O is a foot-treadle pivoted to the frame A, one end of which extends under the weight M, and serves the purpose to raise the weight when the outer end of the treadle is pressed upon by the foot of the operator.

O′ is a cushion secured to the base A′, and is intended to break the force or jar of the weight M when released from its holding mechanism, consisting of the bolt N, staples n n′, bell-crank lever l‴, pawls l″ l′ and lever L‴.

The scale beam J″ is provided with an insulator, j′, placed at the top or outer end, which may be made of any material suitable for that purpose.

The weight M is suspended by means of the lever L‴ and the armature L″, which is held down upon the electro-magnet L′, and kept in that position until released by the breaking of the circuit of the electric current, (generated by the battery L,) which is done when the scale-beam rises and becomes separated from the loop j″. When this occurs, the lever L‴ is allowed to turn upon its pivot, and this releases the pivoted detent or lever l′, which supports the weight M when in its elevated position, as seen in Fig. 1. When released, the weight M draws the pawl l″ in a downward direction and turns the bell-crank lever l‴ upon its axis, and as this lever l‴ is connected to the bolt N by staples or links n n′ the bolt N is drawn in a direction to compress the spring N′, and this forces the bolt N back from under the hook e″ of the shaft E″, allowing the shaft E″ to fly up and throw the whole machine out of gear.

P P are guides for a platform or carriage upon which the packages to be filled may be placed, which platform may be raised and lowered by means of ropes or chains on pulleys t, which are secured to a shaft, T, which has a hand-wheel, R, and a pulley, T′, provided with a rope or cord, t′, attached to a counterbalance-weight, T″. T‴ is a collar attached to the shaft T. A lever, S, having notches s, is pivoted to the frame A, and is provided with a weight, S′, hung thereon so as to engage with any one of the notches s, whereby it may be kept in any desired place on the lever S. To the inner end of the lever S is pivoted a vertical shaft, S″, enlarged at its upper end and curved to fit the lower part of the collar T‴, whereby pressure may be given to the collar T‴ by means of the lever S and its adjustable weight S′, so that the rotation of the shaft T may be accelerated or retarded at will, according to the position of the weight S′, whether placed near or farther from the pivot or fulcrum of said lever S, and by this means regulate the descent of the carriage or platform supporting the vessel while being filled or packed.

The vertical shaft F is provided with a bevel-wheel, f, which meshes into the bevel-wheel f′ on the shaft F″, which has a bearing in the sliding box E⁴. At the bottom of this box, and pivoted thereto, is the lever E‴. It will therefore be readily seen that when a downward pressure is made upon the lever G, the shaft E″ will be drawn downward, together with the lever E‴, secured at e to the shaft E, and thus force the sliding box E⁴ in an upward direction, and thus throw the bevel-wheels f f′ into gear and cause the rotation of the shaft F.

The devices herein shown and described as having reference specifically to the packing mechanism are hereby disclaimed as being, per se, a part of the subject-matter here sought to be protected, as they are to form the subject-matter of another application.

Having described my invention, what I desire to secure by Letters Patent, and claim, is—

1. In a combined electrical weighing-scale and flour-packer, the combination of a flour-box having a bottom of pivoted slats provided with means for automatically opening and closing the same, with a scale-box, a scale-beam, and an electric circuit, the scale-beam being adapted to open said circuit, for the purpose herein described.

2. In a combined electrical weighing-scale and flour-packer, the combination, with frame A A′ A″, of lever L‴, having armature L″ with electro-magnet L′, battery L, wires k k′, scale-beam J″, provided with insulator j′, and metal loop j″, as described, and for the purposes set forth.

3. In a combined electrical weighing-scale and flour-packer, the scale-box D, the box J, attached to frame A, the arm J′, the vertical rod j, pivoted at its lower extremity to the scale-beam J″, and metal loop j″, in combination with wires k k′, battery L, electro-magnet L′, and lever L‴, having armature L″, as described, and for the purposes set forth.

4. In a combined electrical weighing-scale and flour-packer, the combination, with the flour-box having a bottom composed of pivoted slats, of the scale-box, the scale-beam, and the rod interposed between the scale box and beam, an electric circuit of which the beam forms a part, the magnet, and the armature-lever, and interposed devices, which, when the circuit is broken through the tilting of the beam, act to stop the feeding of the material.

5. In a combined weighing-scale and flour-packer, the combination, with the flour-box, the bottom composed of pivoted slats, the packing-cylinder, and the shaft and its attached devices within the same, of the scale-box, the scale-beam, the interposed rod, an electric circuit of which the beam forms a part, the magnet, and the armature-lever, and interposed devices, which, when the circuit is broken through the tilting of the beam, act to stop the feeding of the material.

6. In a combined electrical weighing-scale and flour-packer, the combination, with the scale-box, the rod interposed between it and the beam, the scale-beam having an insulated portion, the metallic loop, and the conducting-wires connecting, respectively, the beam and the loop, of the armature-lever and the magnet.

In testimony whereof I affix my signature in presence of two witnesses.

CHARLES W. ROTH.

Witnesses:
JOHN T. HINSON,
WM. H. GUDGEL.